Figure 1:
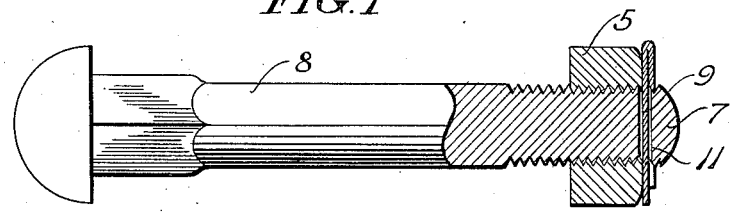

J. W. WINGETT.
NUT LOCK.
APPLICATION FILED APR. 29, 1911.

1,004,951.

Patented Oct. 3, 1911.

WITNESSES:
JR Mahaney
R H Butler

INVENTOR.
J. W. WINGETT.
BY
ATTORNEYS.

UNITED STATES PATENT OFFICE.

JOHN W. WINGETT, OF WASHINGTON, PENNSYLVANIA.

NUT-LOCK.

1,004,951.  Specification of Letters Patent.  Patented Oct. 3, 1911.

Application filed April 29, 1911. Serial No. 624,043.

*To all whom it may concern:*

Be it known that I, JOHN W. WINGETT, a citizen of the United States of America, residing at Washington, in the county of Washington and State of Pennsylvania, have invented certain new and useful Improvements in Nut-Locks, of which the following is a specification, reference being had therein to the accompanying drawing.

This invention relates to nut locking devices and the objects of my invention are to furnish a bolt with positive and reliable means in a manner as will be hereinafter set forth for locking a nut upon a bolt whereby it cannot become accidentally displaced, and to provide a nut lock that can be advantageously used in connection with rail joints, bridges, rolling stock and structures subjected to vibrations that have a tendency to displace nuts.

Other objects of my invention are to provide a nut locking device that can be cut and stamped from a single sheet of metal, and to afford means for locking a nut that can be manipulated by unskilled labor.

Further objects of my invention are to provide a nut lock that can be used in connection with the present type of nut, and to accomplish the above results by an inexpensive and durable device.

I attain the above objects by a mechanical construction that will be hereinafter specifically described and then claimed.

Reference will now be had to the drawing, wherein:—

Figure 2:
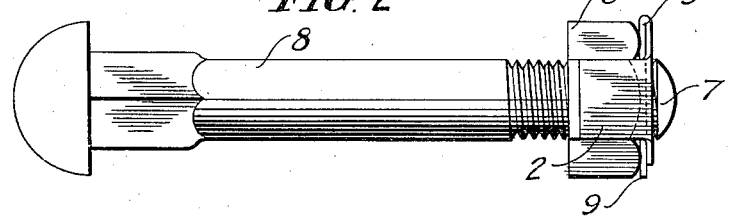
Figure 3:
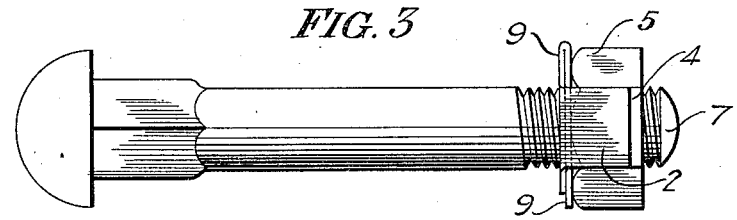
Figure 4:
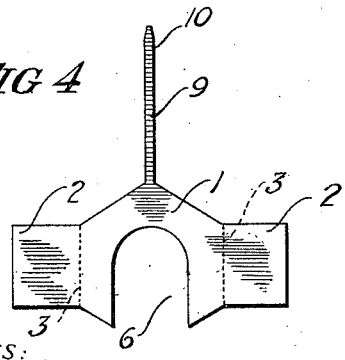
Figure 5:
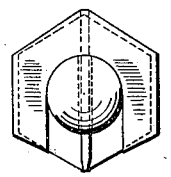

Figure 1 is a longitudinal sectional view of the nut lock in accordance with this invention. Fig. 2 is a side elevation of the same. Fig. 3 is a similar view showing the nut locking device in another position. Fig. 4 is a plan of a blank nut locking device, and Fig. 5 is an end view of the nut lock.

A nut lock in accordance with this invention is made of malleable metal and is cut or stamped from sheet metal to form a flat body 1 having diametrically opposed lateral extensions 2 adapted to be bent upon the dotted line 3 into parallelism to engage the opposite facets 4 of a nut 5.

The body 1 is provided with a slot 6 at the lower edge thereof, the inner end of the slot terminating centrally of the body and this slot is adapted to provide clearance for the screw threaded end 7 of a bolt 8. The slot 6 is of sufficient depth whereby the body 1 will be concentric relatively to the bolt upon which it is mounted.

The upper edge of the body has a malleable narrow tongue 9 adapted to be bent at the upper edge of the body into parallelism with said body, the tongue 9 having the end thereof tapered, as at 10 and said tongue is of a sufficient length that the lower end thereof will extend below the lower edge of the body 1. When mounting the washer upon a bolt, the tongue 9 is adapted to pass through a vertical opening 11 provided therefor in the end of the bolt, said tongue preventing the washer from rotating and the lateral extensions of said washer preventing the nut 5 from rotating. The lateral extensions are of a sufficient length to engage the facets of the nut 5 even though the washer is positioned some distance from the nut, and the exact location of the washer depends upon the location of the opening 11. As shown in Fig. 1 the opening is adjacent to the end of the bolt and as shown in Fig. 3 the washer is reversed whereby the tongue thereof can extend through an opening adjacent to the inner threads of the bolt 8.

It will be noted that the tongue is bent inwardly between the lateral extensions 2 and between the body and the nut, and it is in this connection that I reserve the right to bend the tongue outwardly upon the outer side of the body 1.

With the device made of malleable metal it can be removed by resorting to the use of a suitable instrument and it can be again used or until the lateral extensions are broken by being bent back and forth.

While in the drawing there is illustrated a preferred embodiment of the invention, it is to be understood that the structural elements are susceptible to such variations as fall within the scope of the appended claim.

What I claim is:—

A nut lock comprising the combination with a bolt having the threaded end thereof provided with an opening and a nut mounted upon said threaded end, of a washer mounted upon the bolt and comprising a body having the lower portion thereof provided with a slot for the reception of said bolt, oppositely disposed lateral extensions carried by said body bent to engage with oppositely disposed facets of the nut to prevent the turning of the latter upon the washer, a tongue carried by the upper portion of said body and bent downwardly into parallelism with respect to said body and extending through the opening of said bolt to prevent turning of the washer.

In testimony whereof I affix my signature in the presence of two witnesses.

JOHN W. WINGETT.

Witnesses:
   Max H. Srolovitz,
   Christina T. Hood.

Copies of this patent may be obtained for five cents each, by addressing the "Commissioner of Patents, Washington, D. C."